(12) United States Patent
Stastny et al.

(10) Patent No.: US 7,451,541 B2
(45) Date of Patent: Nov. 18, 2008

(54) METHOD OF HEAT SHIELDING AN INNER TUBE

(75) Inventors: Honza Stastny, Georgetown (CA); Eng Lim, Mississauga (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 518 days.

(21) Appl. No.: 11/049,976

(22) Filed: Feb. 4, 2005

(65) Prior Publication Data

US 2006/0174962 A1 Aug. 10, 2006

(51) Int. Cl.
*B21D 53/06* (2006.01)
*B23P 11/00* (2006.01)
*B21C 37/06* (2006.01)

(52) U.S. Cl. ............ 29/890.036; 29/890.053; 29/412; 29/463; 72/368; 138/157; 285/382; 285/419

(58) Field of Classification Search ............ 29/890.036, 29/890.045, 890.053, 463, 525.14, 412, 416, 29/417; 72/368, 369, 370.03, 370.06, 370.12; 138/157, 171, 172, 178; 285/230, 334.5, 285/381.1, 382, 382.4, 417, 419
See application file for complete search history.

(56) References Cited

U.S. PATENT DOCUMENTS

| | | | |
|---|---|---|---|
| 3,645,092 | A | 2/1972 | Tatsutomi et al. |
| 3,908,372 | A | 9/1975 | Fowler et al. |
| 3,911,961 | A | 10/1975 | Peyton et al. |
| 4,501,302 | A | 2/1985 | Harwood |
| 4,590,652 | A | 5/1986 | Harwood |
| 4,619,292 | A | 10/1986 | Harwood |
| 4,647,713 | A | 3/1987 | de Nijs et al. |
| 4,656,712 | A | 4/1987 | Harwood et al. |
| 4,656,713 | A | 4/1987 | Rosa et al. |
| 4,712,295 | A | 12/1987 | Peele et al. |
| 4,840,201 | A * | 6/1989 | Botsolas .................. 138/178 |
| 5,775,379 | A | 7/1998 | Manofsky et al. |
| 6,315,005 | B1 | 11/2001 | Sproule, III |
| 6,431,216 | B1 | 8/2002 | Briscoe |
| 6,679,045 | B2 | 1/2004 | Karafillis et al. |
| 6,715,297 | B1 | 4/2004 | Swinford et al. |

FOREIGN PATENT DOCUMENTS

| | | | |
|---|---|---|---|
| EP | 30776 A2 * | 6/1981 | |
| GB | 2119884 A * | 11/1983 | |
| JP | 2000018482 A * | 1/2000 | |

* cited by examiner

*Primary Examiner*—Jermie E Cozart
(74) *Attorney, Agent, or Firm*—Ogilvy Renault LLP

(57) ABSTRACT

A protective sheath for a fluid-carrying tube is made from a larger tube cut into longitudinal tube segments and slice into opposed halves before being re-secured together about the fluid-carrying tube. Slip joints are preferably provided between adjoining outer tube segments.

15 Claims, 9 Drawing Sheets

METHOD OF HEAT SHIELDING AN INNER TUBE

TECHNICAL FIELD

The invention relates generally to tube insulation and, more particularly, to tube heat shields and methods for thermally shielding tubes.

BACKGROUND OF THE ART

Fluid-carrying tubes, such as gas turbine engine oil tubes, often require insulation when exposed to hot temperature environments. Insulation sheathes typically comprise a protective metal sheet that surrounds an insulating material covering the fluid-carrying tube. The protective sheathes are typically formed of separate sheet metal halves resistance welded together about the inner pipe and the insulation material. Such protective sheathes are costly to produce and sometimes present dynamic issues.

Accordingly, there is a need to provide an improved way of heat shielding tubes exposed to high temperatures.

SUMMARY OF THE INVENTION

It is therefore an object of this invention to overcome the aforementioned drawbacks of the prior art.

In one aspect, the present invention provides a method of heat shielding an inner tube, comprising the steps of: a) providing an outer tube having a length $L_1$; b) segmenting the outer tube into at least first and second axially extending tube sections of length $L_2$ and $L_3$, respectively; c) dividing the first and second tube sections longitudinally along the length thereof forming two opposed portions of each of said first and second tube sections; and d) re-securing respective portions of the first and second tube sections together around the inner tube.

In another aspect, the present invention provides a method of heat shielding an inner tube, comprising the steps of: a) providing an outer tube b) cutting the outer tube transversally to a longitudinal axis thereof and longitudinally therealong to obtain first and second axial tube sections split into respective first and second opposed portions and c) re-securing respective first and second opposed portions of the first and second tube sections together around the inner tube.

In another aspect, the present invention provides a method of shielding an inner tube, comprising the steps of: a) surrounding said inner tube with first and second sheath segments mounted in an end-to-end relationship longitudinally along said inner tube, and b) providing a slip joint between said first and second axial sheath segments.

In another aspect, the present invention provides a fluid-carrying tube assembly comprising an inner tube, an insulation liner surrounding the inner tube, and a sheath covering the insulation liner, the sheath having at least first and second axially extending tubular sheath sections disposed in an end-to-end relationship with a sliding joint therebetween.

The term inner tube is herein intended to refer to the tube that needs to be thermally insulated.

Further details of these and other aspects of the present invention will be apparent from the detailed description and figures included below.

DESCRIPTION OF THE DRAWINGS

Reference is now made to the accompanying figures depicting aspects of the present invention, in which:

FIGS. 3a to 3g illustrate the various steps of a process for installing a protective sheath over the oil tube shown in FIG. 2 in accordance with an embodiment of the present invention;

DETAILED DESCRIPTION OF THE PREFERRED EMBODIMENTS

Figure 1:
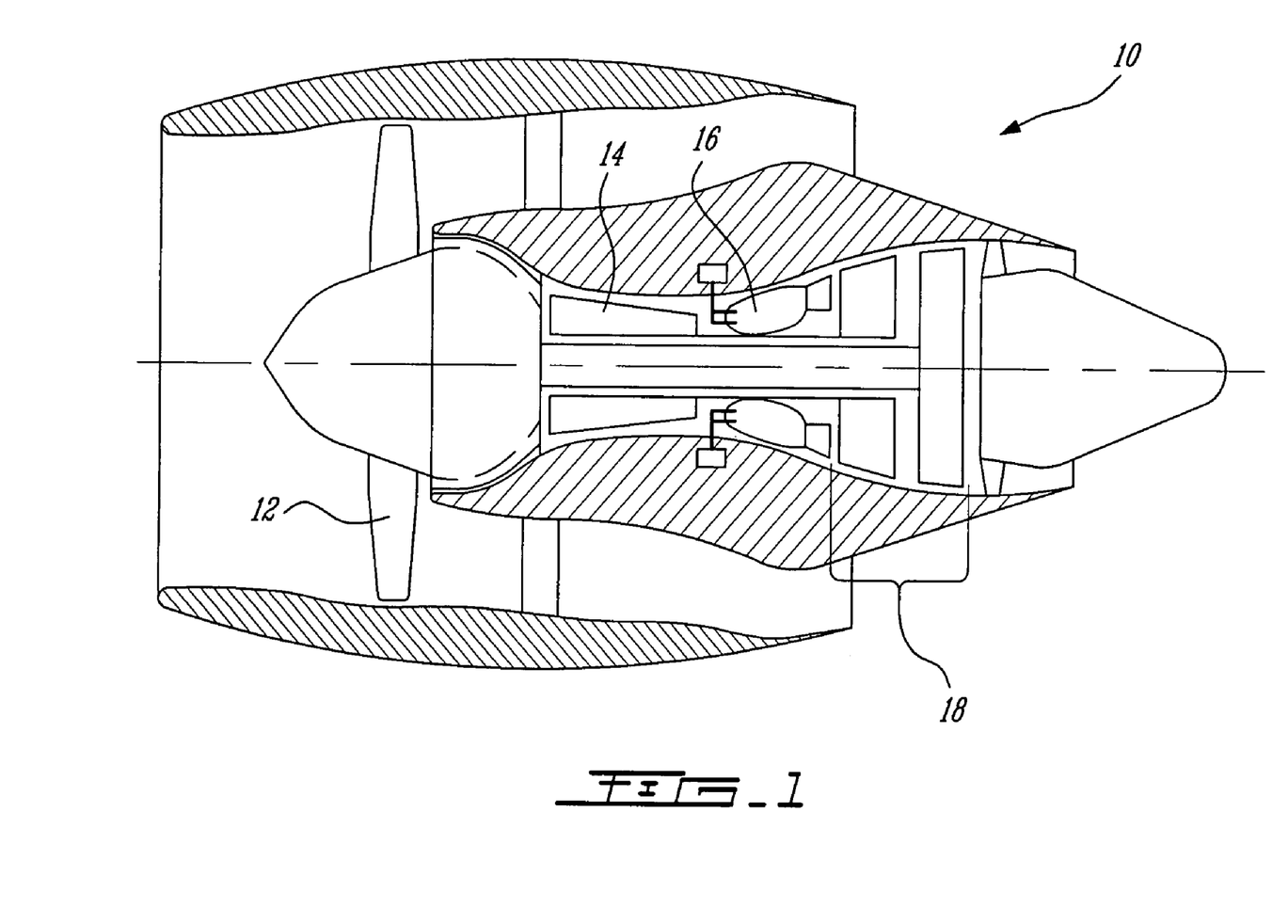
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
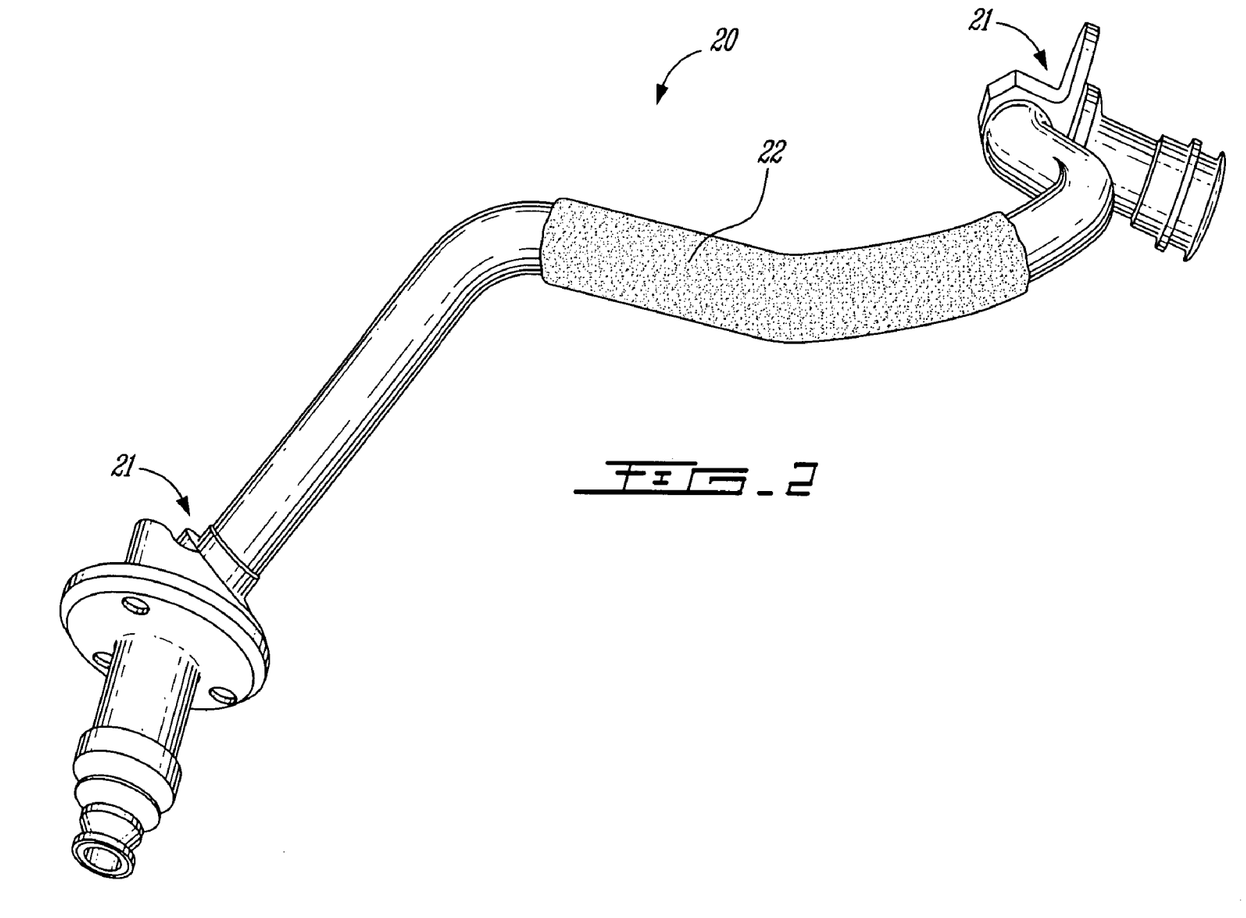
FIG. 2 is a perspective view of an oil tube forming part of the gas turbine engine shown in FIG. 1.

FIG. 2 illustrates a typical oil-carrying tube 20 provided with ferrules or fittings 21 at opposed ends thereof. The oil tube 20 is representative of the non-linear oil tubes typically mounted next to the combustor 16 for carrying oil to various lubricated engine parts. Such tubes are exposed to hot temperatures and, thus, often require insulation. Accordingly, a tube insulation liner 22 covers oil tube 20 for thermally shielding same against the hot surrounding environment.

Figure 3A:
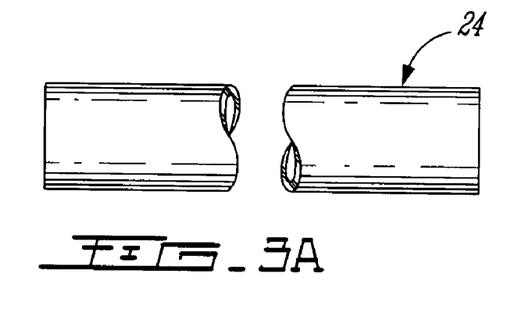

Rather than using a sheet metal to form a protective sheeting cover around the insulation liner 22, a larger-diameter piece of tubing or outer tube 24 is used, as shown in FIG. 3a. The outer tube 24 has an inner diameter slightly greater than the outer diameter of the inner tube formed by the oil tube 20 and the surrounding insulation liner 22. According to the illustrated embodiment, the oil tube 20 to be insulated is ½ inch in diameter with an added 0.060 inch of heat resistant insulation material therearound. The outer tube 24 is about $^{11}\!/_{16}$ inch in diameter and is selected to have a length $L_1$ slightly greater than the length of the inner tube 20 when unbent.

Figure 3B:
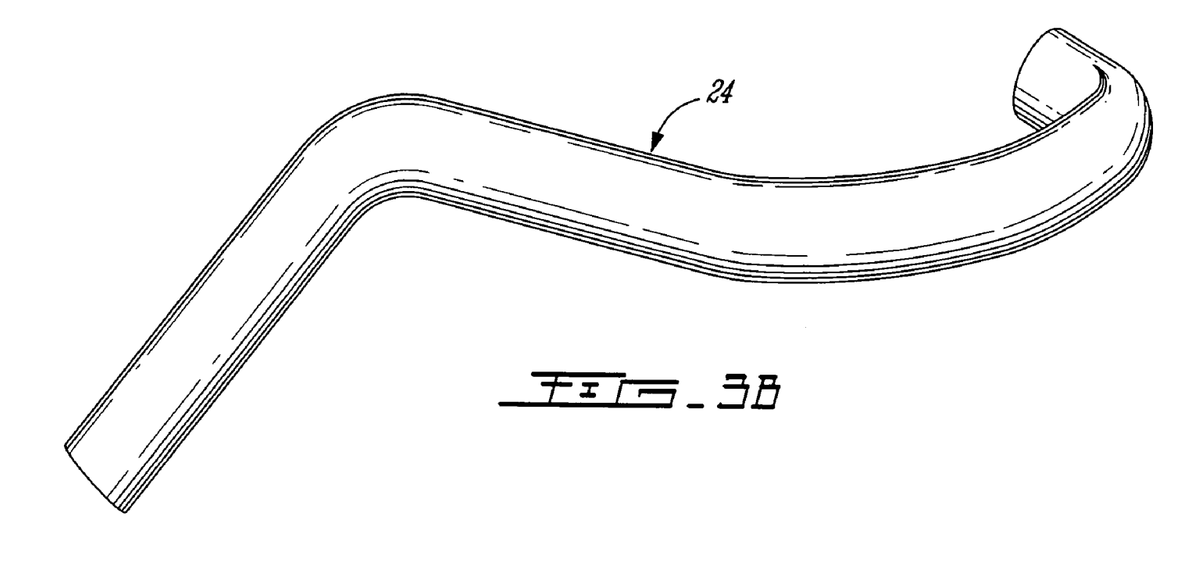

As shown in FIG. 3b, the outer tube 24 is first bent substantially to the same shape as the oil pipe 20. Various methods are contemplated to form the outer tube 24 into the required shape. The bending is preferably carried out on a programmable bender. In the embodiment depicted, the length of the middle portion (the straight intermediate portion) of the outer tube 24 is made longer than that of the corresponding straight middle portion of the oil tube 20 for reasons that will become apparent hereinbelow.

Figure 3C:
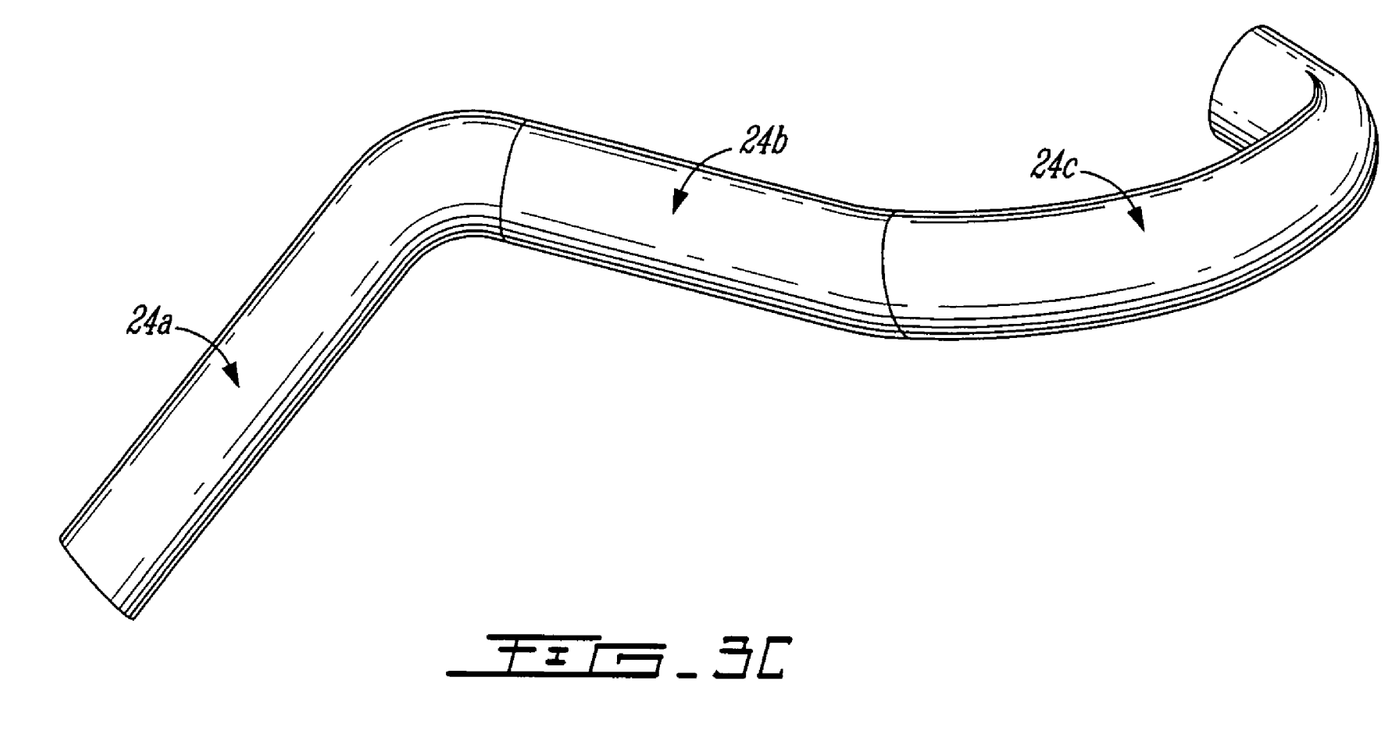

As shown in FIG. 3c, the outer tube 24 is then cut transversally to a longitudinal axis thereof into first, second and third axially extending tube sections 24a, 24b and 24c, each tube section being the counterpart of a corresponding axially extending section of the oil tube 20 shown in FIG. 2. It is understood that the number of tube sections into which the outer tube 24 is cut will vary depending on the complexity of the shape and length of the tube to be heat shielded. The intermediate straight tube section, namely the second tube section 24b, is cut too long in length to permit overlapping at the opposed ends thereof 26 and 28 (FIG. 3d) with adjacent ends 30 and 32 (FIG. 3d) of the tube sections 24a and 24c once assembled over the oil tube 22, as will be seen hereinafter.

Referring now to FIG. 3d, it can be seen that the opposed ends 26 and 28 of the second tube section 24b are thereafter expanded in cross-section for slidably receiving respective adjacent ends 30 and 32 of the first and third tube sections 24a and 24c. A conventional cold deformation process is preferably used to expand the ends 26 and 28 of the second tube section 24b. The terminal ends 34 and 36 of the first and third tube sections 24a and 24c are shrunk or otherwise mechanically deformed to fit the fitting 21 at opposed end of the oil tube 20.

Figure 3E:
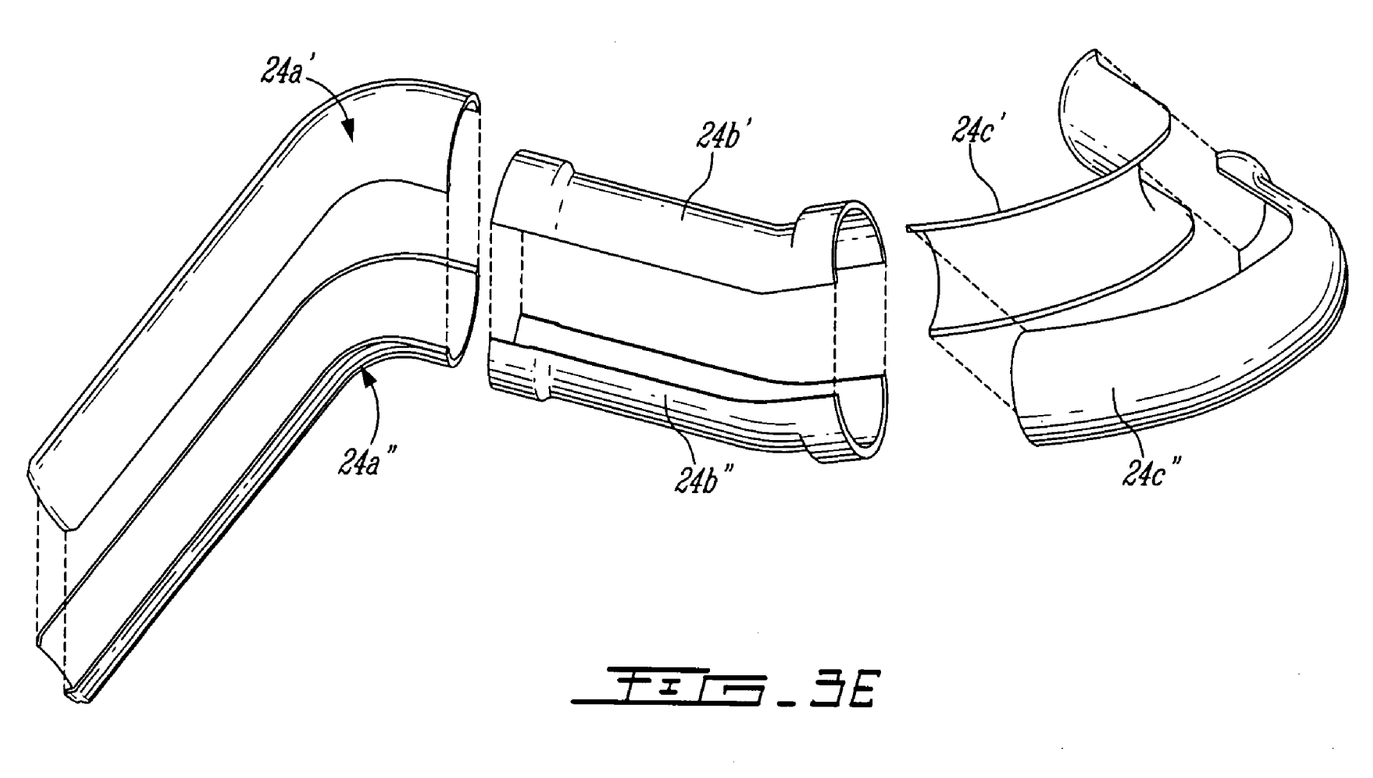

As shown in FIG. 3e, the first, second and third outer tube sections 24a, 24b and 24c are then cut or otherwise slice longitudinally along all the length thereof into two opposed longitudinal halves 24a', 24a'', 24b', 24b'', 24c' and 24c''. A plasma arc or laser cutting apparatus can be used to cut the tube sections 24a, 24b and 24c. The tube sections 24a, 24b and 24c are preferably longitudinally cut in different planes to provide a discontinuous seam along the outer tube once re-secured around the oil tube, as will be seen hereinafter.

Figure 3F:
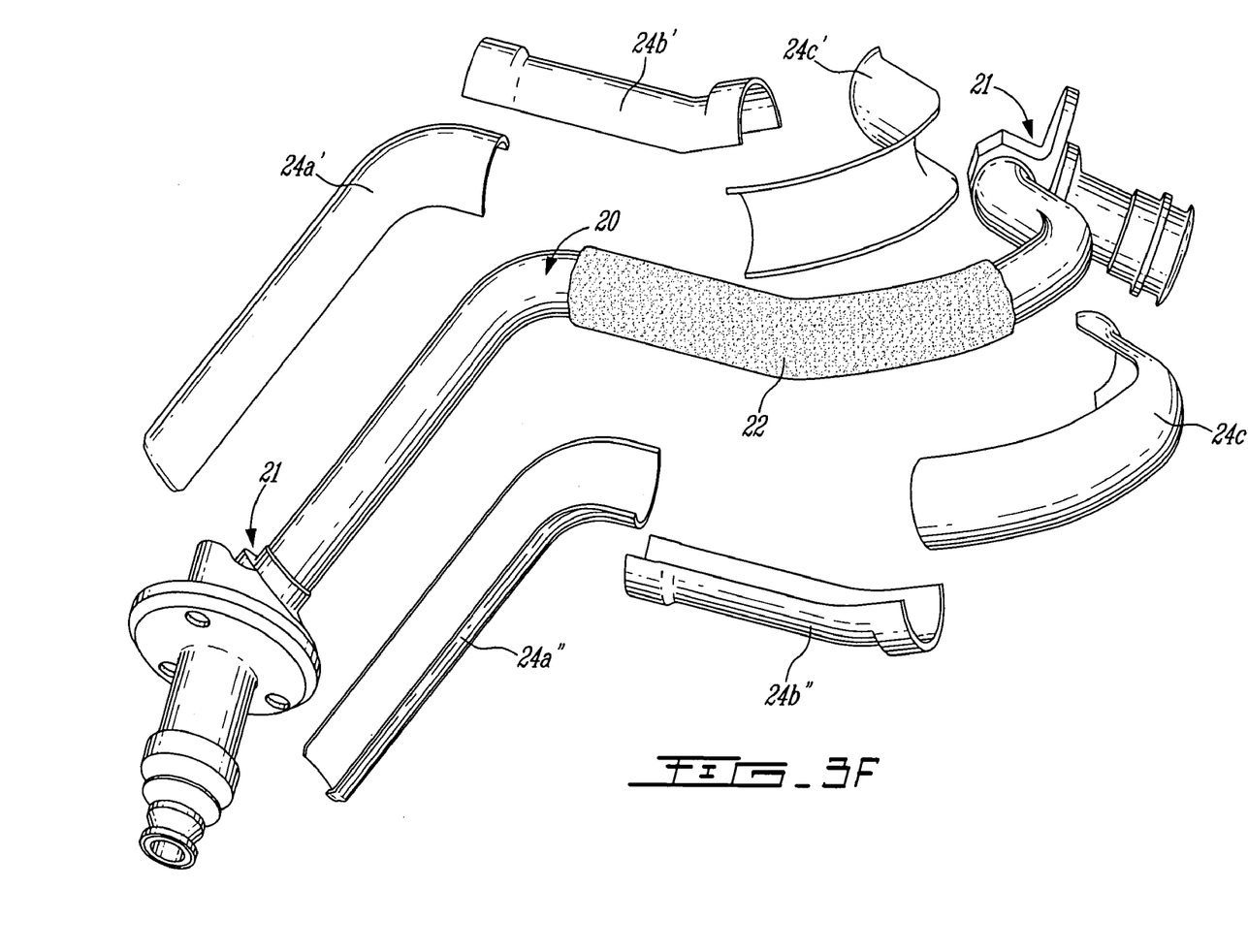

As shown in FIGS. 3f and 3g, the opposed halves 24a', 24a'', 24b', 24b'', 24c' and 24c'' are then placed over the oil tube 20 and the insulation liner 22 and re-secured back to their respective original counterparts along the cut lines, preferably using TIG welding. The welds are preferably continuous along the cuts.

Figure 5:
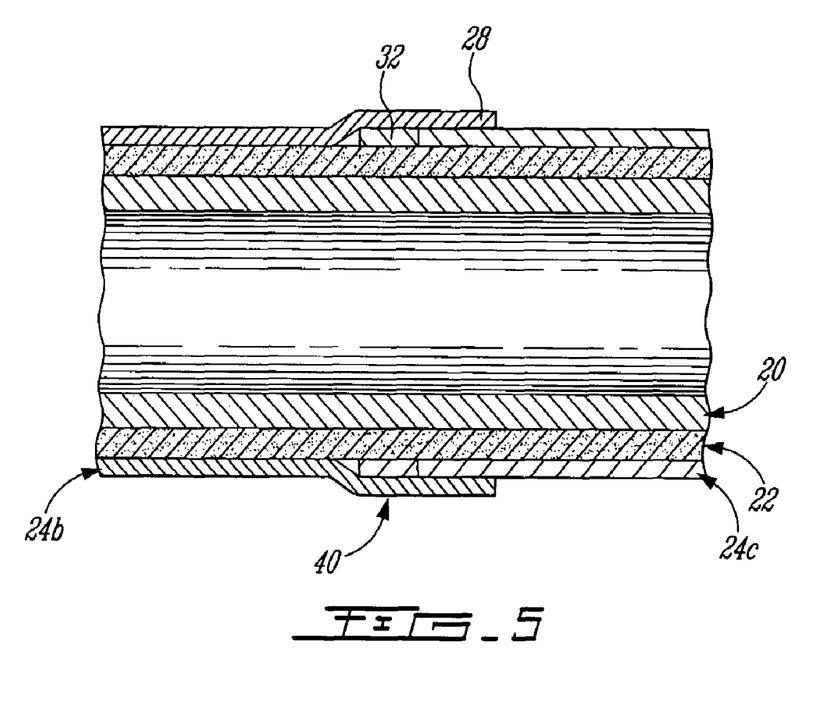
FIG. 5 is a cross-sectional view taken along line 5-5 in FIG. 3g.

As best shown in FIGS. 3g and 5, the opposed ends 26 and 28 of the second tube section 24b axially overlap the adjoining ends 30 and 32 of the first and third tube sections 24a and 24c to create a sliding joint 40 between each of the various tube sections forming the segmented outer protective tube of the oil tube 20. In use, the first, second and third protective outer tube sections 24a, 24b and 24c are free to axially expand and move relative to each other under various temperatures loading. This contributes to strengthen the overall assembly.

Figure 4:
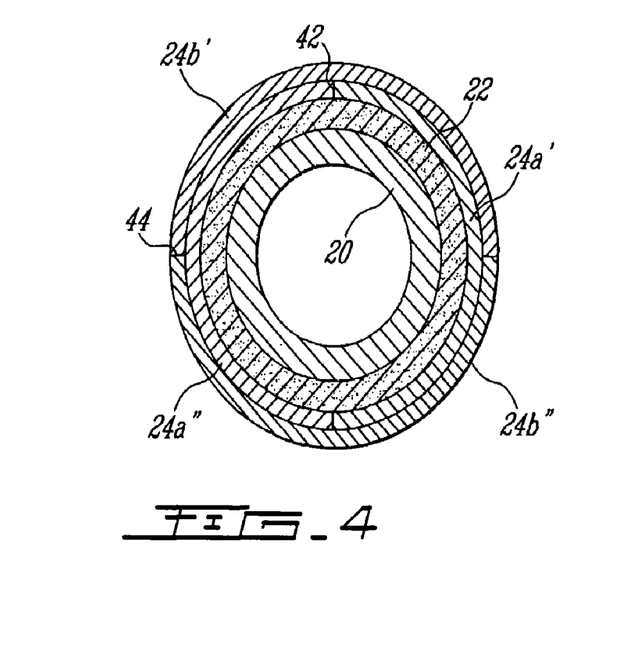
FIG. 4 is a cross-sectional view taken along line 4-4 in FIG. 3g.

From FIG. 4, it can be appreciated that the opposed halves 24a' and 24a'' of the first outer tube section 24a are welded back together in a plane 42 perpendicular to the plane 44 in which the halves 24b' and 24b'' of the second outer tube section 24b have been cut and re-welded together. This discontinuity in the seam of the protective outer tube 24 also contributes to strengthen the assembly.

The above description is meant to be exemplary only, and one skilled in the art will recognize that changes may be made to the embodiments described without department from the scope of the invention disclosed. For example, the insulation liner can be applied over the oil tube only after the outer tube has been longitudinally and transversally cut into a number of longitudinal halves. Also, it is understood that the outer tube 24 can be cut into any desired number of longitudinal tube segments. Also, the longitudinal cut along the length of the outer tube can be done before or after the tube has been cut into longitudinal segments. It is also understood that slip joint could be provided between one or several of the outer tube segments. Still other modifications which fall within the scope of the present invention will be apparent to those skilled in the art, in light of a review of this disclosure, and such modifications are intended to fall within the appended claims.

The invention claimed is:

1. A method of heat shielding an inner tube, comprising the steps of: a) providing an outer tube having a length $L_1$; b) segmenting the outer tube into at least first and second axially extending tube sections of length $L_2$ and $L_3$, respectively; c) dividing the first and second tube sections longitudinally along the length thereof forming two opposed portions of each of said first and second tube sections; and d) re-securing respective portions of the first and second tube sections together around the inner tube.

2. The method as defined in claim 1, wherein step d) comprises the step of providing a slip joint between the first and second tube sections over the inner tube by placing confronting end portions of the first and second tube sections in longitudinally overlapping relationship.

3. The method as defined in claim 2, comprising the step of expanding a cross-sectional area of one end portion of the first tubular section before step c).

4. The method as defined in claim 1, wherein step a) comprises the step of selecting the outer tube such tat the length $L_1$ thereof is greater than a length of the inner tube, and further comprising the step of overlapping one end portion of the first tube section with an adjacent end portion of the second tube section after the opposed portions thereof have been re-secured together around the inner tube.

5. The method as defined in claim 1, wherein the inner tube is non-linear, and wherein the method comprises the step of forming the outer tube to substantially the same shape as the inner tube.

6. The method as defined in claim 5, wherein step c) is effected by cutting the first and second tube sections in half along the entire length thereof, and wherein the first and second tube sections are cut in different planes to provide a discontinuous seam along the outer tube once re-secured around the inner tube.

7. The method as defined in claim 1, comprising the step of crimping opposed ends of the first and second tube sections onto corresponding ends of the inner cube.

8. The method as defined in claim 1, comprising the step of covering the inner tube with a heat shielding material prior to step d), the heat shielding material being comprised between the inner and outer tubes.

9. A method of heat shielding an inner tube, comprising the steps of: a) providing an outer tube b) cutting the outer tube transversally to a longitudinal axis thereof and longitudinally therealong to obtain first and second axial tube sections split into respective first and second opposed portions and c) re-securing respective first and second opposed portions of the first and second tube sections together around the inner tube.

10. The method as defined in claim 9, wherein step c) comprises the step of placing confronting end portions of the first and second tube sections in longitudinally sliding overlapping relationship, thereby allowing relative movement between the first and second tube sections.

11. The method as defined in claim 10, comprising the step of expanding a cross-sectional area of one end portion off the first tube section.

12. The method as defined in claim 9, wherein step a) comprises the step of selecting the outer tube such that the length thereof is greater than the length of the inner tube, and wherein step c) comprises the step of overlapping one end portion of the opposed portions of the first tube section with an adjacent end portion of the opposed portions of the second tube section.

13. The method as defined in claim 9, wherein the inner tube is non-linear, and wherein the method comprises the step of fanning the outer tube to substantially the same shape as the inner tube.

14. The method as defined in claim 9, wherein step b) is effected by first transversally cutting the outer tubes into said first and second tube sections and then cutting said first and second tube sections in half along the length thereof, and wherein the first and second tube sections are cut in different planes to provide a discontinuous seam along the outer tube once re-secured around the inner tube.

15. The method as defined in claim 9, comprising the step of shrunk fitting opposed ends of the first and second tube sections onto corresponding ends of the inner tube.

* * * * *

UNITED STATES PATENT AND TRADEMARK OFFICE
CERTIFICATE OF CORRECTION

| | | |
|---|---|---|
| PATENT NO. | : 7,451,541 B2 | Page 1 of 1 |
| APPLICATION NO. | : 11/049976 | |
| DATED | : November 18, 2008 | |
| INVENTOR(S) | : Honza Stastny and Eng Lim | |

It is certified that error appears in the above-identified patent and that said Letters Patent is hereby corrected as shown below:

In the claims:

claim 13, column 4, line 53, delete "fanning" and insert --forming--

Signed and Sealed this

Sixth Day of January, 2009

JON W. DUDAS
*Director of the United States Patent and Trademark Office*